United States Patent
Asai et al.

(10) Patent No.: US 12,264,250 B2
(45) Date of Patent: Apr. 1, 2025

(54) COLORING COMPOSITION AND COLORING METHOD

(71) Applicant: Seiko Epson Corporation, Tokyo (JP)

(72) Inventors: Shintaro Asai, Matsumoto (JP); Hiroaki Kida, Shiojiri (JP); Kei Hiruma, Chino (JP); Tomoyuki Ushiyama, Chino (JP); Mitsunobu Nakatani, Shiojiri (JP); Kenta Tsukada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 515 days.

(21) Appl. No.: 17/586,934

(22) Filed: Jan. 28, 2022

(65) Prior Publication Data

US 2022/0243081 A1   Aug. 4, 2022

(30) Foreign Application Priority Data

Jan. 29, 2021   (JP) ................ 2021-012859

(51) Int. Cl.
| | |
|---|---|
| C09D 11/322 | (2014.01) |
| B41J 2/01 | (2006.01) |
| B41J 2/21 | (2006.01) |
| C09D 11/107 | (2014.01) |
| C09D 11/36 | (2014.01) |

(52) U.S. Cl.
CPC ........... *C09D 11/322* (2013.01); *B41J 2/01* (2013.01); *B41J 2/2107* (2013.01); *C09D 11/107* (2013.01); *C09D 11/36* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033

See application file for complete search history.

(56) References Cited

U.S. PATENT DOCUMENTS

| | | | | |
|---|---|---|---|---|
| 2002/0135650 | A1* | 9/2002 | Nagai | C09D 11/38 347/100 |
| 2004/0244622 | A1* | 12/2004 | Ichinose | C09D 11/322 101/491 |
| 2006/0009544 | A1* | 1/2006 | Miyagawa | C09D 11/324 523/160 |
| 2009/0214833 | A1* | 8/2009 | Oyanagi | C09D 11/322 427/256 |
| 2010/0064938 | A1 | 3/2010 | Voit et al. | |
| 2013/0196127 | A1* | 8/2013 | Toyoda | C09D 11/322 106/31.13 |
| 2015/0145935 | A1* | 5/2015 | Toyoda | C09D 11/322 347/95 |
| 2019/0300733 | A1* | 10/2019 | Takiguchi | B41M 5/5218 |
| 2022/0243080 | A1* | 8/2022 | Kida | C09D 11/322 |

FOREIGN PATENT DOCUMENTS

| | | |
|---|---|---|
| JP | 2010-534748 A | 11/2010 |
| JP | 2015-189775 A | 11/2015 |

* cited by examiner

*Primary Examiner* — Manish S Shah
(74) *Attorney, Agent, or Firm* — Harness, Dickey & Pierce, P.L.C.

(57) ABSTRACT

A coloring composition of the present disclosure includes a metal pigment; an acrylic-based resin having an acid value of 200 mgKOH/g or less; and a liquid medium component, the metal pigment includes metal particles, the metal particles are surface-modified with a surface treatment agent, and the surface treatment agent includes at least one selected from the group consisting of a compound represented by the following formula (1) and a compound represented by the following formula (2).

$$(RO)_a P(O)(OH)_{3-a} \qquad (1)$$

$$(R)P(O)(OH)_2 \qquad (2)$$

14 Claims, No Drawings

COLORING COMPOSITION AND COLORING METHOD

The present application is based on, and claims priority from JP Application Serial Number 2021-012859, filed Jan. 29, 2021, the disclosure of which is hereby incorporated by reference herein in its entirety.

BACKGROUND

1. Technical Field

The present disclosure relates to a coloring composition and a coloring method.

2. Related Art

Heretofore, as a method to produce an ornament having a glossy appearance, for example, a metal plating, a foil stamp printing using metal foil, or a thermal transfer using metal foil has been used.

However, the methods as described above are disadvantageously difficult to be applied, for example, to a curved portion.

On the other hand, a composition containing a pigment or a dye has bee used as an ink jet ink to be applied to a recording medium by an ink jet method or as a paint. The method as described above is excellent since the above composition can be preferably applied even to a curved portion.

However, when metal particles are simply used instead of using a pigment or a dye, a problem in that inherent characteristics, such as a glossy feeling, of the metal may not be sufficiently obtained may arise.

In order to solve the problem as described above, the use of metal particles surface-treated with a fluorine-based compound has been proposed (for example, see JP-A-2015-189775).

Although glossiness of a colored portion formed by a composition may be improved to a certain extent, adhesion between a substrate to which the composition is applied and the colored portion formed by the composition is disadvantageously not sufficiently improved.

SUMMARY

The present disclosure is made to solve the problem described above and can be realized as the following application examples.

According to one application example of the present disclosure, there is provided a coloring composition comprising: a metal pigment; an acrylic-based resin having an acid value of 200 mgKOH/g or less; and a liquid medium component. In the coloring composition described above, the metal pigment includes metal particles, the metal particles are surface-modified with a surface treatment agent, and the surface treatment agent includes at least one selected from the group consisting of a compound represented by the following formula (1) and a compound represented by the following formula (2).

$$(RO)_a P(O)(OH)_{3-a} \quad (1)$$

$$(R)_a P(O)(OH)_{3-a} \quad (2)$$

In the above formulas, R represents a hydrocarbon group having one carbon atom or more, and a represents 1 or 2.

In addition, in a coloring composition according to another application example of the present disclosure, R represents a hydrocarbon group having 10 to 30 carbon atoms.

In addition, in a coloring composition according to another application example of the present disclosure, the acid value of the acrylic-based resin is 1 to 100 mgKOH/g.

In addition, in a coloring composition according to another application example of the present disclosure, the acrylic-based resin has a weight average molecular weight of 5,000 to 20,000.

In addition, in a coloring composition according to another application example of the present disclosure, the acrylic-based resin is formed from at least one acrylic-based monomer, and a rate thereof occupied in the acrylic-based resin is 90 percent by mass or more.

In addition, in a coloring composition according to another application example of the present disclosure, the coloring composition is a solvent-based composition containing an organic solvent as the liquid medium component.

In addition, in a coloring composition according to another application example of the present disclosure, the metal particles are composed of aluminum or an aluminum alloy.

In addition, in a coloring composition according to another application example of the present disclosure, the metal particles are in the form of scales.

In addition, in a coloring composition according to another application example of the present disclosure, a content of the surface treatment agent with respect to 100 parts by mass of the metal particles is 1.0 to 50 parts by mass.

In a coloring composition according to another application example of the present disclosure, the coloring composition is an ink jet ink composition.

In addition, a coloring method according to still another application example of the present disclosure comprises a step of adhering the coloring composition according to the application example of the present disclosure to an object to be colored. In particular, the coloring method described above comprises a step of ejecting the coloring composition which is an ink jet ink composition by an ink jet method so as to adhere to the object functioning as a recording medium.

DESCRIPTION OF EXEMPLARY EMBODIMENTS

Hereinafter, preferable embodiments of the present disclosure will be described in detail.

[1] Coloring Composition

First, a coloring composition of the present disclosure will be described.

Incidentally, heretofore, as a method to produce an ornament having a glossy appearance, for example, a metal plating, a foil stamp printing using metal foil, or a thermal transfer using metal foil has been used.

However, the methods as described above are disadvantageously difficult to be applied, for example, to a curved portion.

On the other hand, a composition containing a pigment or a dye has been used as an ink jet ink to be applied to a recording medium by an ink jet method or as a paint. The method as described above is excellent since the above composition can be preferably applied even to a curved portion.

However, when metal particles are simply used instead of using a pigment or a dye, a problem in that inherent characteristics, such as a glossy feeling, of the metal may not be sufficiently obtained may arise.

In order to solve the problem as described above, the use of metal particles surface-treated with a fluorine-based compound has been proposed. Accordingly, although dispersibility of the metal particles in the composition is improved to a certain extent, there has been a problem in that adhesion between a substrate to which the composition is applied and a colored portion formed by the composition may not be sufficiently improved.

Accordingly, through intensive research carried out to solve the problem described above, the present inventor achieved the present disclosure. That is, the coloring composition of the present disclosure includes: a metal pigment; an acrylic-based resin having an acid value of 200 mgKOH/g or less; and a liquid medium component, the metal pigment includes metal particles, the metal particles are surface-modified with a surface treatment agent, and the surface treatment agent includes at least one selected from the group consisting of a compound represented by the following formula (1) and a compound represented by the following formula (2).

$$(RO)_a P(O)(OH)_{3-a} \quad (1)$$

$$(R)_a P(O)(OH)_{3-a} \quad (2)$$

In the above formulas, R represents a hydrocarbon group having one carbon atom or more, and a represents 1 or 2.

Accordingly, a coloring composition can be provided which may be preferably applied to production of a colored body excellent in dispersion stability of the metal particles, glossy feeling, and adhesion between a substrate to which the coloring composition is applied and a colored portion formed by the coloring composition. In addition, since a fluorine-based surface treatment agent is not required, this coloring composition is also advantageous in terms of environmental conservation.

In addition, a drying property of a coating film of the coloring composition can be improved, and for example, even when colored bodies produced using the coloring composition are overlapped one another, generation of offset can be effectively prevented.

In addition, when the coloring composition is an ink jet ink composition to be ejected by an ink jet method, besides the advantages as described above, advantages, such as more preferable fine pattern formation and an excellent on-demand property, may also be obtained by using an ink jet method. In addition, for example, an ejection stability of liquid droplets within a relatively short time after production of the ink jet ink composition can be improved, and in addition, even when the ink jet ink composition is stored for a long time or is stored under severe conditions, for example, the ejection stability of the liquid droplets can be improved.

On the other hand, when the conditions described above are not satisfied, the results may not be satisfied.

For example, when the coloring composition includes no acrylic-based resin or uses another resin instead of the acrylic-based resin, the adhesion between the substrate to which the coloring composition is applied and the colored portion formed by the coloring composition cannot be sufficiently improved. In addition, depending on the type of resin to be used instead of the acrylic-based resin, the following problems may arise in some cases. That is, for example, the dispersion stability of the metal particles in the coloring composition is seriously degraded, and/or the glossy feeling of the colored body produced using the coloring composition may be seriously degraded.

In addition, even when the coloring composition includes an acrylic-based resin, if the acid value of the acrylic-based resin is excessively high, the dispersion stability of the metal particles in the coloring composition is seriously degraded, and in addition, the glossy feeling of the colored body produced using the coloring composition becomes insufficient.

In addition, even if the coloring composition includes an acrylic-based resin having a predetermined acid value, when the metal particles are not surface-modified with the surface treatment agent or when the metal particles are surface-modified with a surface modification agent other than the compound represented by the above formula (1) and/or the compound represented by the above formula (2), the following problems may arise. That is, at least one of the dispersion stability of the metal particles in the coloring composition, the glossy feeling of the colored body produced using the coloring composition, and the adhesion between the substrate to which the coloring composition is applied and the colored portion formed by the coloring composition is degraded. In particular, when a fluorinated-based surface treatment agent is used instead of using the compound represented by the above formula (1) and/or the compound represented by the above formula (2), the adhesion between the substrate to which the coloring composition is applied and the colored portion formed by the coloring composition is particularly degraded.

In addition, in the following description, the at least one surface treatment agent selected from the group consisting of the compound represented by the above formula (1) and the compound represented by the above formula (2) is also called "specific surface treatment agent".

Hereinafter, constituent components of the coloring composition of the present disclosure will be described.

[1-1] Metal Pigment

The coloring composition of the present disclosure includes a metal pigment composed of metal particles.

The metal particles forming the metal pigment are surface-modified with a specific surface treatment agent which will be described later. In more particular, it is believed that since an OH group on the surface of the metal particle reacts with a part of a phosphorus-containing acid group of the specific surface treatment agent, the metal particle and the specific surface treatment agent are bonded to each other with a covalent bond or a hydrogen bond.

In the metal particle, at least part of the metal particle visually viewed from the outside thereof is formed from a metal material, and in general, the vicinity of an outer surface of the metal particle is formed from a metal material.

The metal particles are a component which has a significant influence on the appearance of the colored body produced using the coloring composition.

The metal particle may be a particle in which at least a region including the vicinity of the surface is formed from a metal material, and for example, the metal particle may be entirely formed from a metal material or may have a base portion formed from a non-metal material and a coating film formed from a metal material which covers the base portion. In addition, the metal particle may have an oxidized coating film, such as a passivation film, on its surface. Even by the metal particles as described above, the problems as described above occurred in the past; however, by using the present disclosure, the excellent advantages as described above can be obtained.

As a metal material forming the metal particles, elemental metals or various types of alloys may be used. For example, aluminum, silver, gold, platinum, nickel chromium, tin, zinc, indium, titanium, iron, or copper may be mentioned. Among those mentioned above, the metal particles are preferably formed from aluminum or an aluminum alloy. The reason aluminum or an aluminum alloy is preferable is a low specific gravity thereof as compared to that of iron or the like. Accordingly, when the particles formed from aluminum or an aluminum alloy are dispersed in the coloring composition, sedimentation of the particles significantly slowly proceeds; hence, for example, while generation of density irregularity is prevented, the coloring composition can be stored for a longer time.

In addition, while an increase in production cost of the colored body produced using the coloring composition is suppressed, the glossy feeling and luxury feeling of the colored body can be particularly improved. Although aluminum and an aluminum alloy each have a specifically excellent glossy feeling among various types of metal materials, the present inventor found that when the particles formed from the material mentioned above are used for the coloring composition, the following problems may arise. That is, the present inventor found that the storage stability of the coloring composition is specifically degraded, and in addition, in particular, when the coloring composition as described above is used as an ink jet ink composition, problems, such as degradation in ejection stability due to an increase in viscosity caused by gelation, are specifically liable to occur. On the other hand, since the specific surface treatment agent is used together with the metal pigment, even if the particles formed from aluminum or an aluminum alloy are used, the problems as described above can be reliably prevented. That is, since the metal particles are formed from aluminum or an aluminum alloy, the advantages of the present disclosure can be more significantly obtained.

Although the metal particles may have any shapes, such as spherical, spindle, or needle shapes, particles having scale shapes are preferable.

Accordingly, on the substrate to which the coloring composition is applied, main surfaces of the metal particles can be disposed so as to be along the surface shape of the substrate. As a result, for example, the inherent glossy feeling of the metal material forming the metal particles can be more effectively obtained in the colored body thus obtained, and in addition, while the glossy feeling and the luxury feeling of the colored body can be specifically improved, the adhesion of the colored portion of the colored body can also be specifically improved.

In the present disclosure, the scale shape indicates a shape, such as a flat sheet shape or a curved sheet shape, in which when the particle is observed at a predetermined angle, for example, when the particle is viewed in plan, an area thereof viewed in plan is larger than an area of the particle viewed at an angle orthogonal to the above observation angle. In particular, when the particle is viewed in a direction in which a projection area thereof is maximized, that is, when the particle is viewed in plan, the area thereof is represented by $S_1$ [μm$^2$], and an area of the particle viewed in one direction among the directions orthogonal to the above observation direction in which the area thereof is maximized is represented by $S_0$ [μm$^2$]. In the case described above, $S_1/S_0$ is preferably 2 or more, more preferably 5 or more, even more preferably 8 or more, further preferably 10 or more, and even further preferably 20 or more. Although an upper limit of $S_1/S_0$ is not particularly limited, the upper limit described above is preferably 1,000, more preferably 500, and further preferably 100. In particular, as the value described above, for example, an average value obtained such that after arbitrary 50 particles are observed, the average is calculated therefrom may be used. The observation may be performed by an electron microscope or an atomic force microscope.

Alternatively, a volume average particle diameter (D50) which will be described later and an average thickness are used, and after the units thereof are made coincide with each other, the volume average particle diameter (D50)/the average thickness may be obtained as the range described above.

When the metal particles are in the form of scales, although a lower limit of the average thickness of the metal particles is not particularly limited, the lower limit described above is preferably 5 nm, more preferably 10 nm, and further preferably 15 nm. In addition, when the metal particles are in the form of scales, although an upper limit of the average thickness of the metal particles is not particularly limited, the upper limit described above is preferably 90 nm, more preferably 70 nm, and even more preferably 50 nm, further preferably 30 nm, and even further preferably 25 nm.

The average thickness may be measured using an atomic force microscope. Although the measurement method is not particularly limited, for example, the average thickness may be measured by an atomic force microscope method using NanoNavi E-Sweep (manufactured by SII Nano Technology Inc.). For example, arbitrary 50 metal particles are measured, and the average value thereof is used as the average thickness.

Accordingly, the advantages obtained by the scale-shaped particles as described above can be significantly obtained.

Although a lower limit of the volume average particle diameter of the metal particles is not particularly limited, the lower limit described above is preferably 0.20 μm, more preferably 0.25 μm, and further preferably 0.30 μm. In addition, although an upper limit of the volume average particle diameter of the metal particles is not particularly limited, the upper limit described above is preferably 1.00 μm, more preferably 0.90 μm, further preferably 0.80 μm, and even further preferably 0.50 μm.

Accordingly, while the storage stability, water resistance, and the like of the coloring composition are further improved, for example, generation of unfavorable density irregularity in the colored body produced using the coloring composition is effectively prevented, and the glossy feeling of the colored body and the adhesion of the colored portion of the colored body can be further improved.

In addition, in the present disclosure, the volume average particle diameter indicates the median diameter of a volume distribution of a particle dispersion liquid measured using a laser diffraction/scattering method and is the size of the particles at a central cumulative value of 50%, that is, is the size of the particles obtained when the existence ratios of particles having individual sizes thus measured are cumulated to 50%. When the metal particles are in the form of scales, the volume average particle diameter thereof is to be obtained based on the shapes and the sizes of the metal particles which are assumed to have sphere shapes.

In addition, an upper limit of a particle diameter D90 from a fine particle side of the metal particles contained in the coloring composition to a volume cumulative distribution of 90% is preferably 1.50 μm, more preferably 1.20 μm, and further preferably 0.95 μm.

Accordingly, while the storage stability, the water resistance, and the like of the coloring composition are further improved, the generation of unfavorable density irregularity in the colored body produced using the coloring composition is more effectively prevented, and the glossy feeling and the adhesion of the colored portion of the colored body can be further improved.

Although a lower limit of a content of the metal particles in the coloring composition is not particularly limited, the lower limit described above is preferably 0.1 percent by mass, more preferably 0.2 percent by mass, and further preferably 0.3 percent by mass. In addition, although an upper limit of the content of the metal particles in the coloring composition is not particularly limited, the upper limit described above is preferably 30 percent by mass, more preferably 20 percent by mass, and even more preferably 15 percent by mass, further preferably 10 percent by mass, and even further preferably 5 percent by mass.

Accordingly, while the storage stability, the water resistance, and the like of the coloring composition are further improved, the glossy feeling of the colored body produced using the coloring composition and the adhesion of the colored portion of the colored body can be significantly improved.

In particular, when the coloring composition is an ink itself to be ejected by an ink jet method, although a lower limit of a content of the metal particles in the ink is not particularly limited, the lower limit described above is preferably 0.1 percent by mass, more preferably 0.2 percent by mass, and further preferably 0.3 percent by mass. In addition, when the coloring composition is an ink itself to be ejected by an ink jet method, although an upper limit of the content of the metal particles in the ink is not particularly limited, the upper limit described above is preferably 2.4 percent by mass, more preferably 2.2 percent by mass, and further preferably 1.8 percent by mass.

In addition, when the coloring composition is a paint or an undiluted solution to be used for preparation of an ink, a paint, or the like, although a lower limit of the content of the metal particles in the coloring composition is not particularly limited, the lower limit described above is preferably 2.0 percent by mass, more preferably 2.5 percent by mass, and further preferably 3.0 percent by mass. In addition, when the coloring composition is a paint or an undiluted solution to be used for preparation of an ink to be ejected by an ink jet method, although an upper limit of the content of the metal particles in the coloring composition is not particularly limited, the upper limit described above is preferably 30 percent by mass, more preferably 20 percent by mass, even more preferably 15 percent by mass, and further preferably 10 percent by mass.

Although the metal particles may be produced by any method, when the metal particles are formed from Al, particles are preferably obtained such that a film is formed from Al by a vapor phase film formation method and is then pulverized. Accordingly, at the colored portion formed by the coloring composition of the present disclosure, for example, the inherent glossy feeling of Al can be more effectively expressed. In addition, variation in characteristics between the particles can be suppressed. In addition, by the method described above, even relatively thin metal particles can be preferably produced.

When the metal particles are produced by the method as described above, for example, by forming a film from Al on a base material, the metal particles can be preferably produced. As the base material described above, for example, a plastic film formed from a poly(ethylene terephthalate) or the like may be used. In addition, the base material may have a release agent layer on its film surface.

In addition, the pulverization described above is preferably performed in a liquid by applying ultrasonic vibration to the film described above. Accordingly, metal particles having the particle diameters as described later can be easily and reliably obtained, and in addition, variation in size, shape, and characteristics between the metal particles can be suppressed from being generated.

In addition, when the pulverization is performed by the method described above, as the liquid described above, for example, an alcohol, a hydrocarbon-based compound, an ether-based compound, or a polar compound, such as propylene carbonate, γ-butyrolactone, N-methy-2-pyrrolidone, N,N-dimethylformamide, N,N-dimethylacetamide, dimethylsulfoxide, cyclohexanone, or acetonitrile, may be preferably used. Since the solvent as described above is used, for example, while unfavorable oxidation of the metal particles is prevented, the productivity of the metal particles is particularly improved, and in addition, the variation in size, shape, and characteristics between the metal particles can be significantly suppressed.

As the alcohol, for example, methanol, ethanol, propanol, or butanol may be mentioned. As the hydrocarbon-based compound, for example, n-heptane, n-octane, decane, dodecane, tetradecane, toluene, xylene, cymene, durene, indene, dipentene, tetrahydronaphthalene, decahydronaphthalene, or cyclohexylbenzene may be mentioned. In addition, as the ether-based compound, for example, there may be mentioned ethylene glycol dimethyl ether, ethylene glycol diethyl ether, ethylene glycol methyl ethyl ether, diethylene glycol dimethyl ether, diethylene glycol diethyl ether, tetraethylene glycol monobutyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxyethane, bis(2-methoxyethyl)ether, p-dioxane, or tetrahydrofuran.

[1-2] Acrylic-Based Resin

The coloring composition of the present disclosure includes an acrylic-based resin having an acid value of 200 mgKOH/g or less.

In the colored body produced using the coloring composition, the acrylic-based resin described above primarily has a function to improve the adhesion between the substrate to which the coloring composition is applied and the colored portion formed by the coloring composition and also has a function to improve the dispersion stability of the metal particles in the coloring composition and the glossy feeling of the colored body produced using the coloring composition.

Although the acrylic-based resin may be a polymer primarily formed from an acrylic-based monomer, a rate of the acrylic-based monomer in all constituent monomers forming the acrylic-based resin is preferably 50 percent by mass or more, more preferably 80 percent by mass or more, and further preferably 90 percent by mass or more. An upper limit of the rate described above is 100 percent by mass or less. In addition, a rate of the constituent monomer occupied in the resin is represented by percent by mass in a monomer composition used when the resin is prepared by polymerization.

Accordingly, the dispersion stability of the metal particles in the coloring composition, the adhesion of the colored portion of the colored body produced using the coloring composition, and the glossy feeling of the colored body can be further improved.

As the acrylic-based monomer to form the acrylic-based resin, for example, (meth)acrylic acid or an ester compound thereof may be mentioned.

In more particular, as the acrylic-based monomer, for example, (meth)acrylic acid, methyl (meth)acrylate, ethyl (meth)acrylate, butyl (meth)acrylate, or 2-ethylhexyl (meth) acrylate may be mentioned.

The acrylic-based resin may include as the constituent monomer, a monomer other than the acrylic-based monomer described above. As the monomer as described above, for example, a vinyl-based monomer may be mentioned. As the vinyl-based monomer, for example, styrene may be mentioned.

However, a rate of the monomer other than the acrylic-based monomer in all the constituent monomers forming the acrylic-based resin is preferably 50 percent by mass or less, more preferably 20 percent by mass or less, and further preferably 10 percent by mass or less. A lower limit of the rate described above is 0 percent by mass or more. For example, the rate of the vinyl-based monomer may be set in the range described above.

The acid value of the acrylic-based resin may be 200 mgKOH/g or less. A lower limit thereof is 0 mgKOH/g or more, preferably 1 to 100 mgKOH/g, more preferably 2 to 80 mgKOH/g, even more preferably 3 to 40 mgKOH/g, further preferably 4 to 30 mgKOH/g, even further preferably 5 to 15 mgKOH/g, and particularly preferably 5 to 10 mgKOH/g.

Accordingly, the dispersion stability of the metal particles in the coloring composition, the adhesion of the colored portion of the colored body produced using the coloring composition, and the glossy feeling of the colored body can be further improved.

The acid value may be measured by a potentiometric titration method. As a potentiometric titration device, for example, a device named "AT610" manufactured by Kyoto Electronics manufacturing Co., Ltd. is used. The measurement may be performed, for example, in accordance with JIS K0070.

The acid value may be adjusted by increasing or decreasing a rate of a monomer having an acid value in the monomer composition forming the acrylic-based resin. When the rate of the monomer having an acid value is increased, the acid value may be adjusted higher, and when the rate of the monomer having an acid value is decreased, the acid value may be adjusted lower. As the monomer having an acid value, for example, a monomer having an acidic group may be mentioned. As the acidic group, for example, a carboxy group or a sulfo group may be mentioned. As the monomer having an acidic group, for example, (meth)acrylic acid may be mentioned.

Although a lower limit of the weight average molecular weight of the acrylic-based resin is not particularly limited, the lower limit described above is preferably 5,000, more preferably 6,000, and further preferably 7,000. In addition, although an upper limit of the weight average molecular weight of the acrylic-based resin is not particularly limited, the upper limit described above is preferably 20,000, more preferably 19,000, and further preferably 18,000. The weight average molecular weight may be measured by a gel permeation chromatography.

Accordingly, the dispersion stability of the metal particles in the coloring composition, the adhesion of the colored portion of the colored body produced using the coloring composition, and the glossy feeling of the colored body can be further improved.

Although a lower limit of a content of the acrylic-based resin in the coloring composition is not particularly limited, the lower limit described above is preferably 0.01 percent by mass, more preferably 0.03 percent by mass, and further preferably 0.07 percent by mass. In addition, although an upper limit of the content of the acrylic-based resin in the coloring composition is not particularly limited, the upper limit described above is preferably 15 percent by mass, more preferably 10 percent by mass, and further preferably 7.0 percent by mass.

Accordingly, the dispersion stability of the metal particles in the coloring composition, the adhesion of the colored portion of the colored body produced using the coloring composition, and the glossy feeling of the colored body can be further improved.

In particular, when the coloring composition is an ink itself to be ejected by an ink jet method, although a lower limit of a content of the acrylic-based resin in the ink is not particularly limited, the lower limit described above is preferably 0.01 percent by mass, more preferably 0.03 percent by mass, and further preferably 0.07 percent by mass. In addition, when the coloring composition is an ink itself to be ejected by an ink jet method, although an upper limit of the content of the acrylic-based resin in the ink is not particularly limited, the upper limit described above is preferably 5.0 percent by mass, more preferably 2.0 percent by mass, and further preferably 0.7 percent by mass.

In addition, when the coloring composition is a paint or an undiluted solution to be used for preparation of an ink, a paint, or the like, although a lower limit of the content of the acrylic-based resin in the coloring composition is not particularly limited, the lower limit described above is preferably 0.1 percent by mass, more preferably 0.3 percent by mass, and further preferably 0.7 percent by mass. In addition, when the coloring composition is a paint or an undiluted solution to be used for preparation of an ink to be ejected by an ink jet method, although an upper limit of the content of the acrylic-based resin in the coloring composition is not particularly limited, the upper limit described above is preferably 15 percent by mass, more preferably 10 percent by mass, and further preferably 7.0 percent by mass.

The content of the acrylic-based resin in the coloring composition with respect to 100 parts by mass of the metal particles is preferably 1.0 to 50 parts by mass, more preferably 1.5 to 40 parts by mass, and further preferably 2.0 to 30 parts by mass.

Accordingly, the dispersion stability of the metal particles in the coloring composition, the adhesion of the colored portion of the colored body produced using the coloring composition, and the glossy feeling of the colored body can be further improved.

[1-3] Specific Surface Treatment Agent

The metal particles described above are surface-modified with a specific surface treatment agent.

The specific surface treatment agent is at least one selected from the group consisting of the compound represented by the above formula (1) and the compound represented by the above formula (2).

Although R in the above formulas (1) and (2) may be a hydrocarbon group having one carbon atom of more, R is a hydrocarbon group having preferably 5 to 30 carbon atoms, more preferably 10 to 30 carbon atoms, even more preferably 12 to 26 carbon atoms, further preferably 12 to 25 carbon atoms, even further preferably 13 to 24 carbon atoms, and particularly preferably 14 to 22 carbon atoms.

Accordingly, the dispersion stability of the metal particles in the coloring composition can be further improved, and the glossy feeling of the colored body produced using the coloring composition and the adhesion between the colored portion formed by the coloring composition and the substrate to which the coloring composition is applied can be further improved.

As the hydrocarbon group described above, for example, an alkyl group, an alkenyl group, or an alkynyl group may be mentioned.

The coloring composition of the present disclosure may contain, as the specific surface treatment agent, at least two types of compounds. In the case as described above, the same metal particles may be surface-treated with at least two types of specific surface treatment agents. In addition, the coloring composition of the present disclosure may include, as the metal particles, at least two types of metal particles surface-treated with specific surface treatment agents different from each other.

The surface treatment of the metal particles with the specific surface treatment agent may be performed such that for example, when a metal-made film formed by a vapor phase film forming method is pulverized in a liquid into metal particles as described above, the specific surface treatment agent is contained in the liquid described above.

When the surface treatment is performed on the same metal particles with at least two types of specific surface treatment agents, the surface treatment may be performed by a plurality of steps corresponding to the number of the at least two types of specific surface treatment agents or may be performed in the same step using the at least two types of specific surface treatment agents.

Although a lower limit of a content of the specific surface treatment agent in the coloring composition is not particularly limited, the lower limit described above is preferably 0.01 percent by mass, more preferably 0.03 percent by mass, and further preferably 0.05 percent by mass. In addition, although an upper limit of the content of the specific surface treatment agent in the coloring composition is not particularly limited, the upper limit described above is preferably 10 percent by mass, more preferably 7.0 percent by mass, and further preferably 5.0 percent by mass.

Accordingly, the dispersion stability of the metal particles in the coloring composition, the glossy feeling of the colored body produced using the coloring composition, and the adhesion of the colored portion of the colored body can be further improved.

In particular, when the coloring composition is an ink itself to be ejected by an ink jet method, although a lower limit of a content of the specific surface treatment agent in the ink is not particularly limited, the lower limit described above is preferably 0.01 percent by mass, more preferably 0.03 percent by mass, and further preferably 0.05 percent by mass. In addition, when the coloring composition is an ink itself to be ejected by an ink jet method, although an upper limit of the content of the specific surface treatment agent in the ink is not particularly limited, the upper limit described above is preferably 1.5 percent by mass, more preferably 1.0 percent by mass, and further preferably 0.8 percent by mass.

In addition, when the coloring composition is a paint or an undiluted solution to be used for preparation of an ink, a paint, or the like, although a lower limit of the content of the specific surface treatment agent in the coloring composition is not particularly limited, the lower limit described above is preferably 0.50 percent by mass, more preferably 0.70 percent by mass, and further preferably 1.0 percent by mass. In addition, when the coloring composition is a paint or an undiluted solution to be used for preparation of an ink to be ejected by an ink jet method, although an upper limit of the content of the specific surface treatment agent in the coloring composition is not particularly limited, the upper limit described above is preferably 10 percent by mass, more preferably 7.0 percent by mass, and further preferably 5.0 percent by mass.

Although the content of the specific surface treatment agent in the coloring composition is not particularly limited, the content described above with respect to 100 parts by mass of the metal particles is preferably 1.0 to 50 parts by mass, more preferably 1.5 to 40 parts by mass, and further preferably 2.0 to 30 parts by mass.

Accordingly, the dispersion stability of the metal particles in the coloring composition, the glossy feeling of the colored body produced using the coloring composition, and the adhesion of the colored portion of the colored body can be further improved. In addition, when the coloring composition is an ink jet ink composition, the ejection stability of the ink jet ink composition, in particular, the ejection stability thereof when the ink jet ink composition is stored for a long time or is stored under severe conditions, can be further improved.

[1-4] Liquid Medium Component

The coloring composition of the present disclosure includes a liquid medium component.

The liquid medium component itself is a component in the form of liquid, and in the coloring composition of the present disclosure, the liquid medium component has a primary function as a dispersion medium to disperse the metal particles. In addition, the liquid medium component has a function to enable the coloring composition to easily adhere to the substrate.

In addition, since the coloring composition includes the liquid medium component, when the coloring composition is an ink itself to be ejected by an ink jet method, the ink can be ejected by an ink jet method.

As the liquid medium component, for example, water and various types of organic solvents may be mentioned.

When the coloring composition of the present disclosure is a solvent-based composition which contains an organic solvent as the liquid medium component, the dispersion stability of the metal particles in the coloring composition, the glossy feeling of the colored body produced using the coloring composition, and the adhesion of the colored portion of the colored body can be further improved.

As the organic solvent contained in the coloring composition of the present disclosure, for example, an alcohol, a hydrocarbon-based compound, an ether-based compound, a ketone, an ester, or a polar solvent, such as propylene carbonate, N-methy-2-pyrrolidone, N,N-dimethylformamide, N,N-dimethylacetamide, dimethylsulfoxide, cyclohexanone, or acetonitrile, may be preferably used.

As the alcohol, for example, a monovalent alcohol, such as methanol, ethanol, propanol, isopropyl alcohol, or butanol; or a polyvalent alcohol, such as ethylene glycol, propylene glycol, or 1,2-hexanediol, may be mentioned. In addition, as the hydrocarbon-based compound, for example, n-heptane, n-octane, decane, dodecane, tetradecane, toluene, xylene, cymene, durene, indene, dipentene, tetrahydronaphthalene, decahydronaphthalene, or cyclohexylbenzene may be mentioned. In addition, as the ether-based compound, for example, a glycol ether may be preferably mentioned. As the glycol ether, for example, there may be mentioned ethylene glycol dimethyl ether, ethylene glycol diethyl ether, ethylene glycol methyl ethyl ether, diethylene glycol dimethyl ether, diethylene glycol diethyl ether, tetraethylene glycol monobutyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxyethane, or bis(2- methoxyethyl)ether. As the ether-based compound, besides those mentioned above, for example, p-dioxane or tetrahydrofuran may also be mentioned. In addition, as the ketone, for example, acetone, methyl ethyl ketone, or diethyl ketone may be mentioned. In addition, as the ester, for example, ethyl acetate, propyl acetate, or butyl acetate may be mentioned. As the ester, for example, a cyclic ester may also be mentioned. As the cyclic ester, for example, a lactone, such as γ-butyrolactone, may be preferably mentioned.

As the coloring composition of the present, a solvent-based composition containing an organic solvent as a primary liquid medium component is preferable.

When the coloring composition of the present disclosure is a solvent-based composition, the organic solvent includes preferably at least one selected from the group consisting of an ether, an ester, a ketone, and an alcohol, more preferably at least one selected from the group consisting of an ether and an ester, even more preferably at least one selected from the group consisting of a glycol ether and a cyclic ester, and particularly preferably a glycol ether.

In particular, at least one selected from the group consisting of diethylene glycol diethyl ether, tetraethylene glycol monobutyl ether, and γ-butyrolactone is further preferably contained.

Accordingly, the dispersion stability of the metal particles in the coloring composition, the glossy feeling of the colored body produced using the coloring composition, and the adhesion of the colored portion of the colored body can be further improved. In addition, a moisture retaining property of the coloring composition can be improved, and for example, when the coloring composition is an ink jet ink composition, unfavorable precipitation of a solid component of the coloring composition caused, for example, by drying at an ink jet head or the like can be effectively prevented. In addition, the viscosity of the coloring composition can be more preferably adjusted.

In particular, when the coloring composition of the present disclosure is a solvent-based composition, a rate of the organic solvent occupied in all liquid medium components forming the coloring composition of the present disclosure is preferably 50 percent by mass or more, more preferably 60 percent by mass or more, further preferably 70 percent by mass or more. An upper limit of the organic solvent is 100 percent by mass or less.

Accordingly, the advantages described above can be more significantly obtained.

When the coloring composition of the present disclosure is a solvent-based composition, a content of water occupied in all the liquid medium components is preferably less than 30 percent by mass. Furthermore, the content of water occupied in all the liquid medium components is preferably sufficiently low, and in particular, the content described above is preferably 5.0 percent by mass or less, more preferably 1.0 percent by mass or less, and further preferably 0.1 percent by mass or less.

The coloring composition of the present disclosure may be an aqueous-based composition which contains water as a primary liquid medium component.

When the coloring composition of the present disclosure is an aqueous-based composition, a rate of the water occupied in all liquid medium components forming the coloring composition of the present disclosure is preferably 30 percent by mass or more, more preferably 40 percent by mass or more, and further preferably 55 percent by mass or more. When the coloring composition of the present disclosure is an aqueous-based composition, an upper limit of the water occupied in all the liquid medium components forming the coloring composition of the present disclosure is 100 percent by mass.

When the coloring composition of the present disclosure is an aqueous-based composition containing water as the liquid medium component, an organic solvent may also be contained together with the water. A content of the organic solvent in the liquid medium component of the aqueous-based composition is preferably less than 50 percent by mass, more preferably 40 percent by mass or less, and further preferably 30 percent by mass or less. A lower limit of the content described above is 0 percent by mass or more.

When the coloring composition of the present disclosure is an aqueous-based composition, as the organic solvent contained together with the water, a liquid component having a solubility to water, that is, a water-soluble organic solvent, is preferable.

Accordingly, the dispersion stability of the metal particles in the coloring composition, the glossy feeling of the colored body produced using the coloring composition, and the adhesion of the colored portion of the colored body can be further improved. In addition, the moisture retaining property of the coloring composition can be improved, and for example, when the coloring composition is an ink jet ink composition, the unfavorable precipitation of the solid component of the coloring composition caused, for example, by drying at an ink jet head or the like can be effectively prevented. In addition, the viscosity of the coloring composition can be more preferably adjusted.

Although the water-soluble organic solvent may be a water-soluble liquid component, for example, a liquid component having a solubility to water at 25° C. of at least 2 g/100 g is preferably used.

The water-soluble organic solvent preferably has a boiling point of 110° C. to 300° C. at one atmospheric pressure.

Accordingly, the moisture retaining property of the coloring composition can be further improved, and for example, when the coloring composition is an ink jet ink composition, the unfavorable precipitation of the solid component of the coloring composition caused, for example, by drying at an ink jet head or the like can be effectively prevented. As a result, the ejection stability of the coloring composition by an ink jet method can be further improved. In addition, after the coloring composition is ejected, if needed, the liquid medium component can be relatively easily evaporated, and hence, the liquid medium component can be effectively prevented from unfavorably remaining in the colored body produced using the coloring composition.

When the coloring composition of the present disclosure is an aqueous-based composition, as the water-soluble organic solvent contained together with the water, for example, an alkyl monoalcohol; glycerin; a glycol, a glycol monoether; a lactam; or a monovalent alcohol may be mentioned, and those mentioned above may be used either alone or in combination.

As the glycol, for example, ethylene glycol, diethylene glycol, triethylene glycol, propylene glycol, or 1,2-hexanediol may be mentioned. In addition, as the glycol monoether, for example, triethylene glycol monobutyl ether may be mentioned. In addition, as the lactam, for example, 2-pyrrolidone may be mentioned. In addition, as the monovalent alcohol, for example, ethanol, methanol, propanol, isopropyl alcohol, butanol, or phenoxyethanol may be mentioned.

Although a lower limit of a content of the liquid medium component in the coloring composition of the present disclosure is not particularly limited, for example, the lower limit described above is preferably 60.0 percent by mass, more preferably 70.0 percent by mass, and further preferably 75.0 percent by mass. In addition, although an upper limit of the content of the liquid medium component in the coloring composition of the present disclosure is not particularly limited, for example, the upper limit described above is preferably 99.7 percent by mass, more preferably 99.5 percent by mass, and further preferably 99.0 percent by mass.

Accordingly, the viscosity of the coloring composition can be made more preferable.

[1-5] Polyoxyalkyleneamine Compound

The coloring composition of the present disclosure may include a polyoxyalkyleneamine compound which is an amine compound having a polyoxyalkyleneamine structure in its molecule.

Accordingly, the dispersion stability of the metal particles in the coloring composition, the adhesion of the colored portion of the colored body produced using the coloring composition, and the glossy feeling of the colored body can be further improved. In addition, an abrasion resistance of the colored body produced using the coloring composition can be improved. In addition, when the coloring composition is used as an ink jet ink composition, the ejection stability of the ink jet ink composition described above can be further improved.

Although the polyoxyalkyleneamine compound is not particularly limited as long as being an amine compound having a polyoxyalkylene structure in its molecule, a compound represented by the following formula (3) or its salt is preferable.

$$R^1—(O—R^2)_x—NH_2 \quad (3)$$

In the above formula, $R^1$ represents a hydrogen atom or an alkyl group having 4 carbon atoms or less, $R^2$ represents an alkylene group having 5 carbon atoms or less, X represents an integer of 5 or more, and the polyoxyalkyleneamine compound may have at least two types of alkylene groups with different conditions of $R^2$ in its molecule.

Accordingly, the dispersion stability of the metal particles in the coloring composition, the glossy feeling of the colored body produced using the coloring composition, and the adhesion of the colored portion of the colored body can be further improved. In addition, when the coloring composition is an ink jet ink composition, the ejection stability of this ink jet ink composition, in particular, the ejection stability thereof when the ink jet ink composition is stored for a long time or is stored under severe conditions, can be further improved.

As described above, the polyoxyalkyleneamine compound is preferably a compound represented by the above formula (3) or its salt.

In the above formula (3), $R^1$ represents preferably an alkyl group having 4 carbon atoms or less and more preferably an alkyl group having 1 or 2 carbon atoms. $R^2$ preferably represents an alkylene group having 1 to 3 carbon atoms and may be either a linear or a branched alkylene group.

Among compounds each represented by the above formula (3) or salts thereof, as the polyoxyalkyleneamine compound, a compound represented by the following formula (4) or its salt is particularly preferable.

$$R^1—(OCH_2CH_2)_m—(OCH_2CH(CH_3))_n—NH_2 \quad (4)$$

In the above formula, $R^1$ represents a hydrogen atom or an alkyl group having 4 carbon atoms or less, n and m each independently represent 0 or an integer of 1 or more, m+n represents an integer of 10 or more, and the order of the oxyethylene units and the oxypropylene units in the molecule of the polyoxyalkyleneamine compound may be arbitrarily determined.

Accordingly, the advantages described above can be further significantly obtained.

In addition, a lower limit of an m/n value which is the ratio of m to n in the above formula (4), that is, the lower limit of the ratio of the numbers of the oxyethylene units to the numbers of the oxypropylene units in the molecule of the polyoxyalkyleneamine compound, is preferably 0.05, more preferably 0.15, and further preferably 0.70. In addition, an upper limit of the m/n value is preferably 10.0, more preferably 9.5, and further preferably 9.0.

Accordingly, the dispersion stability of the metal particles in the coloring composition, the glossy feeling of the colored body produced using the coloring composition, and the adhesion of the colored portion of the colored body can be further improved. In addition, when the coloring composition is an ink jet ink composition, the ejection stability of the ink jet ink composition, in particular, the ejection stability thereof when the ink jet ink composition is stored for a long time or is stored under severe conditions, can be further improved.

As described above, the order of the oxyethylene units and the oxypropylene units in the above formula (4) is not particularly limited. In more particular, in the above formula (4), although the amino group is bonded to one terminal of the continuous oxyethylene units, and the methyl group is bonded to one terminal of the continuous oxypropylene units, the amino group may be bonded to one terminal of the continuous oxypropylene units, and the methyl group may be bonded to one terminal of the continuous oxyethylene units. In addition, the compound represented by the above formula (4) may be either a block copolymer or a random copolymer.

Although a lower limit of the weight average molecular weight of the polyoxyalkyleneamine compound is not particularly limited, the lower limit described above is preferably 400, more preferably 500, even more preferably 600, and further preferably 1,000. In addition, although an upper limit of the weight average molecular weight of the polyoxyalkyleneamine compound is not particularly limited, the upper limit described above is preferably 8,000, more preferably 5,000, and further preferably 3,000.

Accordingly, the dispersion stability of the metal particles in the coloring composition, the glossy feeling of the colored body produced using the coloring composition, and the adhesion of the colored portion of the colored body can be further improved. In addition, when the coloring composition is an ink jet ink composition, the ejection stability of the ink jet ink composition, in particular, the ejection stability thereof when the ink jet ink composition is stored for a long time or is stored under severe conditions, can be further improved.

The coloring composition of the present disclosure may include at least two types of compounds as the polyoxyalkyleneamine compound.

Although a lower limit of a content of the polyoxyalkyleneamine compound in the coloring composition is not particularly limited, the lower limit described above is preferably 0.005 percent by mass, more preferably 0.007 percent by mass, even more preferably 0.01 percent by mass, further preferably 0.02 percent by mass, and even further preferably 0.03 percent by mass. In addition, although an upper limit of the content of the polyoxyalkyleneamine compound in the coloring composition is not particularly limited, the upper limit described above is preferably 5.0 percent by mass, more preferably 3.0 percent by mass, even more preferably 2.0 percent by mass, and further preferably 1.5 percent by mass. The upper limit and the lower limit described above are also preferably set in the ranges described below.

Accordingly, the dispersion stability of the metal particles in the coloring composition, the glossy feeling of the colored body produced using the coloring composition, and the adhesion of the colored portion of the colored body can be further improved. In addition, when the coloring composition is an ink jet ink composition, the ejection stability of the ink jet ink composition, in particular, the ejection stability thereof when the ink jet ink composition is stored for a long time or is stored under severe conditions, can be further improved.

In particular, when the coloring composition is an ink itself to be ejected by an ink jet method, although a lower limit of a content of the polyoxyalkyleneamine compound in the ink is not particularly limited, the lower limit described above is preferably 0.005 percent by mass, more preferably 0.007 percent by mass, even more preferably 0.01 percent by mass, further preferably 0.02 percent by mass, and even further preferably 0.03 percent by mass. In addition, when the coloring composition is an ink itself to be ejected by an ink jet method, although an upper limit of the content of the polyoxyalkyleneamine compound in the ink is not particularly limited, the upper limit described above is preferably 1.0 percent by mass, more preferably 0.70 percent by mass, even more preferably 0.50 percent by mass, and particularly preferably 0.40 percent by mass.

In addition, when the coloring composition is a paint or an undiluted solution to be used for preparation of an ink, a paint, or the like, although a lower limit of the content of the polyoxyalkyleneamine compound in the coloring composition is not particularly limited, the lower limit described above is preferably 0.025 percent by mass, more preferably 0.035 percent by mass, even more preferably 0.05 percent by mass, further preferably 0.10 percent by mass, and even further preferably 0.20 percent by mass. In addition, when the coloring composition is a paint or an undiluted solution to be used for preparation of an ink to be ejected by an ink jet method, although an upper limit of the content of the polyoxyalkyleneamine compound in the coloring composition is not particularly limited, the upper limit described above is preferably 5.0 percent by mass, more preferably 3.5 percent by mass, even more preferably 3.0 percent by mass, further preferably 2.0 percent by mass, and even further preferably 1.5 percent by mass.

A lower limit of the content of the polyoxyalkyleneamine compound in the coloring composition with respect to 100 parts by mass of the metal particles is preferably 0.5 parts by mass, more preferably 0.7 parts by mass, even more preferably 1.0 part by mass, further preferably 1.5 parts by mass, and even further preferably 2.0 parts by mass. In addition, an upper limit of the content of the polyoxyalkyleneamine compound in the coloring composition with respect to 100 parts by mass of the metal particles is preferably 100 parts by mass, more preferably 70 parts by mass, even more preferably 50 parts by mass, further preferably 40 parts by mass, even further preferably 30 parts by mass, and particularly preferably 20 parts by mass.

Accordingly, the dispersion stability of the metal particles in the coloring composition, the glossy feeling of the colored body produced using the coloring composition, and the adhesion of the colored portion of the colored body can be further improved. In addition, when the coloring composition is an ink jet ink composition, the ejection stability of the ink jet ink composition, in particular, the ejection stability thereof when the ink jet ink composition is stored for a long time or is stored under severe conditions, can be further improved.

When the content of the polyoxyalkyleneamine compound in the coloring composition and the content of the specific surface treatment agent in the coloring composition are represented by XA [percent by mass] and XP [percent by mass], respectively, a lower limit of XA/XP is preferably 0.02, more preferably 0.05, and further preferably 0.07. In addition, an upper limit of XA/XP is preferably 10.0, more preferably 7.0, and further preferably 5.0. In addition, the upper limit described above is further preferably 3.0, even further preferably 2.0, and particularly preferably 1.5.

Accordingly, the dispersion stability of the metal particles in the coloring composition, the glossy feeling of the colored body produced using the coloring composition, and the adhesion and the abrasion resistance of the colored portion of the colored body can be further improved.

[1-6] Other Components

The coloring composition of the present disclosure may include components other than those described above. Hereinafter, the components as described above are also called the other components. As the components described above, for example, there may be mentioned a surface treatment agent other than the specific surface treatment agent, a resin other than the acrylic-based resin, a leveling agent, a polymerization promoter, a polymerization inhibitor, a photopolymerization initiator, a dispersant, a surfactant, a penetration enhancer, a moisturizing agent, a colorant, a fixing agent, a fungicide, an antiseptic agent, an antioxidant, a chelating agent, a thickener, and/or a photosensitizer.

As the resin other than the acrylic-based resin, for example, an ester resin, an urethane resin, or a cellulose resin may be mentioned.

As the surfactant, for example, a silicone-based surfactant or an acetylene glycol-based surfactant is preferably mentioned.

However, a content of the other components in the coloring composition of the present disclosure is preferably 2.0 percent by mass or less, more preferably 1.0 percent by mass or less, and further preferably 0.1 percent by mass or less.

[1-7] Others

The coloring composition of the present disclosure may be a composition directly used to form the colored portion. That is, the coloring composition is a composition to be adhered to a substrate (object to be colored) for coloration thereof. That is, the coloring composition is a composition to be used in an adhesion step in a coloring method which will be described later.

In this case, as the coloring composition, for example, an ink or a paint may be mentioned. Although the ink is not particularly limited, for example, an ink jet ink may be mentioned.

In addition, the coloring composition may also be a composition used for preparation of a composition to be adhered to the substrate for coloration thereof. In this case, the coloring composition is not used in the adhesion step in the coloring method which will be described later and is a composition used for preparation of a coloring composition to be used in the adhesion step. That is, after the composition to be used in the coloring method is prepared by mixing the coloring composition with other components for density adjustment or the like, the composition thus prepared is then used to form the colored portion. In this case, as the coloring composition, for example, there may be mentioned a pigment dispersion liquid or an undiluted solution to be used for preparation of a composition which is adhered to the substrate for the coloration thereof.

In particular, the coloring composition is preferably an ink jet ink composition.

Heretofore, when the coloring composition is tried to be applied to an ink jet method, there have been problems in that the ejection stability by an ink jet method, the glossy feeling of the colored body thus produced, and the adhesion of the colored portion of the colored body are liable to be degraded. However, according to the present disclosure, the generation of the problems as described above can be effectively prevented. That is, when the coloring composition is an ink jet ink composition, the advantages of the present disclosure can be more significantly obtained.

The ink jet ink is an ink to be ejected from an ink jet head by an ink jet method and is used for recording.

The substrate is a material to be colored by adhesion of the coloring composition, that is, the substrate is the object to be colored. When the coloring composition is an ink, the substrate is generally a recording medium.

Although the substrate is not particularly limited, for example, besides the recording medium, a plate, a wall, a floor, a fence, a barrier, an automobile, and other articles may be mentioned.

As the recording medium, either an absorptive or a non-absorptive medium may be used, and for example, paper, such as regular paper or ink jet exclusive paper; a plastic material, a metal, a ceramic, a wood, a shell, natural fibers/artificial fibers, such as cotton, polyester, or wool fibers, or a non-woven cloth may be used, and a non-colored body is preferable. In addition, the shape of the recording medium is not particularly limited, and any shape, such as a sheet, may be used.

As the recording medium formed from a plastic material, for example, a plastic film or a plastic sheet may be mentioned. The plastic is not particularly limited, and for example, a poly(vinyl chloride), a polyester, or a polyolefin may be mentioned. As the polyester, for example, a poly(ethylene terephthalate) may be mentioned.

Although an upper limit of the viscosity of the coloring composition of the present disclosure measured at 25° C. using a rotational viscometer in accordance with JIS Z8809 is not particularly limited, the upper limit described above is preferably 25 mPa·s and more preferably 15 mPa·s. In addition, although a lower limit of the viscosity of the coloring composition of the present disclosure measured as described above is not particularly limited, the lower limit described above is preferably 1.5 mPa·s.

Accordingly, for example, when the coloring composition is an ink to be ejected by an ink jet method, liquid droplets of the ink described above can be more preferably ejected by an ink jet method.

[2] Coloring Method

Next, a coloring method will be described.

The coloring method using the coloring composition of the present disclosure includes a step (adhesion step) of adhering the coloring composition to the substrate which is the object to be colored.

Accordingly, a coloring method which can be applied to the production of a colored body excellent in glossy feeling and adhesion of the colored portion can be provided.

The step of adhering the coloring composition of the present disclosure to the substrate may be performed by various types of printing methods, such as an ink jet method, and various types of coating methods using a bar coater, a spray, a roll coater, a brush, and the like.

When the coloring composition is an ink, the coloring method is also a recording method.

In particular, the coloring method using the coloring composition of the present disclosure preferably includes a step of ejecting the coloring composition of the present disclosure described above by an ink jet method so as to adhere to the recording medium.

Accordingly, while the advantages, such as more preferable fine pattern formation and an excellent on-demand property, can be obtained by using an ink jet method, a coloring method which can be applied to the production of a colored body excellent in glossy feeling and adhesion of the colored portion can be provided.

When the coloring composition is ejected by an ink jet method, as the ink jet method, for example, although a piezoelectric method, a method in which an ink is ejected by bubbles generated by heating the ink, or the like may be used, for example, since the coloring composition is not likely to deteriorate, the piezoelectric method is preferable.

The ejection of the coloring composition by an ink jet method may be performed using a known liquid droplet ejection device.

The colored portion formed by the coloring composition may be a portion having, for example, a predetermined pattern or may be formed over the entire surface of the substrate.

[3] Colored Body

Next, a colored body according to the present disclosure will be described.

The colored body according to the present disclosure is produced by applying the coloring composition as described above to the substrate which is the object be colored.

The colored body as described above is excellent in glossy feeling and has a colored portion formed by the coloring composition, and this colored portion has an excellent adhesion and prevents the generation of defects.

The colored body according to the present disclosure may be used for any applications, and for example, the colored body may be applied to recorded matters, ornaments, and others other than those mentioned above. As a particular example of the colored body according to the present disclosure, for example, there may be mentioned automobile interior goods, such as a console lid, a switch base, a center cluster, an interior panel, an emblem, a center console, and a meter name plate; operation portions of various types of electronic devices; decorative portions having decorativeness; and displays, such as an indicator sign and a logo.

Heretofore, although the present disclosure has been described with reference to the preferable embodiments, the present disclosure is not limited thereto.

EXAMPLES

Next, concrete examples of the present disclosure will be described.

[4] Synthesis of Acrylic-Based Resin

First, before a coloring composition was produced, a synthesis of an acrylic-based resin was performed.

Synthetic Example 1

After a reaction chamber equipped with a stirring motor, a stirring blade, a temperature sensor, and a reflux condenser was purged with a nitrogen gas, 500 parts by mass of methyl ethyl ketone was charged therein, and an inside temperature of the chamber was increased to 77° C. with stirring.

In the reaction chamber described above, 60 parts by mass of butyl methacrylate, 315 parts by mass of 2-ethylhexyl methacrylate, 125 parts by mass of ethyl acrylate, and 8 parts by mass of di-t-butyl peroxide were dripped over 4 hours. After the dripping was finished, the inside temperature was maintained at 77° C. for 1 hour, and by changing the reflux condenser to a distillation tube, remaining monomers and the solvent were removed until the inside temperature was increased to 100° C. under normal pressure or appropriate reduced pressure. Subsequently, the temperature was cooled to room temperature, so that an acrylic-based resin A which was the acrylic-based resin was obtained. The acrylic-based resin A had a weight average molecular weight of 17,000 and an acid value of 0 mgKOH/g. The acid value was measured by the method described above.

Synthetic Example 2

Except for that methacrylic acid was also used as the monomer, and the use amounts of the individual monomers were set as shown in Table 1, an acrylic-based resin B which was the acrylic-based resin was synthesized in a manner similar to that in the above Synthetic Example 1. The acid value of the acrylic-based resin B was 10 mgKOH/g.

Synthetic Examples 3 to 6

By using a phenomenon in which as the use amount of methacrylic acid is increased, the acid value is increased, the use amount of methacrylic acid was increased in a stepwise manner as compared to that in the above Synthetic Example 2, and corresponding to the amount of methacrylic acid thus increased, the other monomers other than the methacrylic acid were decreased as compared to those in the above Synthetic Examples 2 proportional to the individual use amounts to adjust the monomer composition. After the acid value was measured, from the acid value thus measured, the monomer composition was finely adjusted to have a desired acid value and again polymerized, so that the acid value was finely adjusted. Accordingly, acrylic-based resins C to F each of which was the acrylic-based resin were synthesized. The acid value of the acrylic-based resin C was 50 mgKOH/g. The acid value of the acrylic-based resin D was 80 mgKOH/g. The acid value of the acrylic-based resin E was 150 mgKOH/g. The acid value of the acrylic-based resin F was 300 mgKOH/g. The weight average molecular weights thereof were each approximately 17,000.

The conditions of the acrylic-based resins obtained in the above Synthetic Examples are collectively shown in Table 1. In Table 1, butyl methacrylate is represented by "BMA", 2-ethylhexyl methacrylate is represented by "2-EHMA", ethyl acrylate is represented by "EA", and methacrylic acid is represented by "MA".

[5] Production of Coloring Composition

Example 1

First, a poly(ethylene terephthalate)-made film having a smooth surface at a surface roughness Ra of 0.02 m or less was prepared.

Next, over one side surface of this film, a release layer was formed by applying a release resin dissolved in acetone using a roller coater.

The poly(ethylene terephthalate)-made film on which the release layer was formed was transported in a vacuum deposition apparatus at a rate of 5 m/s to form an Al-made film having a thickness of 12 nm under reduced pressure.

Next, the poly(ethylene terephthalate)-made film on which the Al-made film was formed was immersed in tetrahydrofuran, and ultrasonic vibration at 40 kHz was applied thereto, so that a dispersion liquid of a metal powder which was aggregates of Al-made metal particles was obtained.

Next, tetrahydrofuran was removed by a centrifugal machine, and diethylene glycol diethyl ether was added, so that a suspension liquid containing 5 percent by mass of the metal powder was obtained.

Subsequently, a treatment was performed on this suspension liquid by a circular type high power ultrasonic pulverizer so that the metal particles were pulverized to have a predetermined size. In this treatment, an ultrasonic wave at 20 kHz was applied.

Next, a polyoxyalkyleneamine compound represented by the above formula (4) was added to the suspension liquid described above to have a mass rate with respect to the metal particles as shown in Table 2, and a heat treatment was performed at 55° C. for 1 hour under ultrasonic radiation at 40 kHz, so that the aggregates of the metal particles were disaggregated, and the metal particles were dispersed in a primary particle state. In this case, as the polyoxyalkyleneamine compound, a block copolymer was used in which an amino group was bonded to one terminal of continuous oxyethylene units and a methyl group was bonded to one terminal of continuous oxypropylene units, m/n in the above formula (4) satisfied a condition of 3.1, and the weight average molecular weight was 2,000.

Furthermore, a specific surface treatment agent which was the compound represented by the above formula (1) was added to have a mass rate with respect to the metal particles as shown in Table 2. In this example, as the specific surface treatment agent, a mixture containing compounds represented by the above formula (1) in which a's were 1 and 2 and in each of which R was an n-decyl group was used.

In addition, by a heat treatment performed at 55° C. for 3 hours under ultrasonic radiation at 28 kHz, the specific

TABLE 1

| | CONSTITUENT MONOMER (PARTS BY MASS) | | | | WEIGHT AVERAGE MOLECULAR | ACID VALUE [mgKOH/ |
|---|---|---|---|---|---|---|
| | BMA | 2-EHMA | EA | MA | WEIGHT | g] |
| ACRYLIC-BASED RESIN A | 60 | 315 | 125 | 0 | 17000 | 0 |
| ACRYLIC-BASED RESIN B | 59 | 310 | 123 | 8 | 17000 | 10 | surface treatment agent was allowed to react on the surfaces of the metal particles, so that a dispersion liquid of the metal particles surface-modified with the specific surface treatment agent was obtained.

Subsequently, diethylene glycol diethyl ether, tetraethylene glycol monobutyl ether, and γ-butyrolactone were added to the dispersion liquid of the metal particles thus obtained, and the acrylic-based resin A was further added, so that a coloring composition having the composition shown in Table 2 was obtained.

A volume average particle diameter of the metal particles contained in the coloring composition thus obtained was 0.25 m, and an average thickness thereof was 12 nm.

Examples 2 to 21

Except for that metal pigments were formed to have compositions as shown in Tables 2 and 3, and the types and the ratios of the raw materials to be contained were changed to have compositions as shown in Tables 2 and 3, coloring compositions were produced in a manner similar to that of the above Example 1. The average thickness of the metal particles was adjusted during the deposition of Al. The average particle diameter of the metal particles was adjusted by controlling a pulverization amount thereof in the ultrasonic pulverization.

Comparative Examples 1 to 8

Except for that the types and the ratios of the raw materials to be used for preparation of the coloring compositions were changed to have compositions as shown in Table 3, coloring compositions were produced in a manner similar to that of the above Example 1.

As for the above Examples and Comparative Examples, the composition of the metal pigment contained in the coloring composition and the composition of the coloring composition are collectively shown in Tables 2 and 3. In addition, the components in the tables are as described below.

(1)-1: as the surface treatment agent represented by the above formula (1), a mixture in which in the formula (1), R represents an n-decyl group, and a's represent 1 and 2.

(1)-2: as the surface treatment agent represented by the above formula (1), a mixture in which in the formula (1), R represents an n-dodecyl group, and a's represent 1 and 2.

(1)-3: as the surface treatment agent represented by the above formula (1), a mixture in which in the formula (1), R represents an n-oleyl group, and a's represent 1 and 2.

(1)-4: as the surface treatment agent represented by the above formula (1), a mixture in which in the formula (1), R represents a stearyl group, and a's represent 1 and 2.

(2)-1: as the surface treatment agent represented by the above formula (2), a compound in which in the formula (2), R represents an n-dodecyl group, and a represents 1.

(2)-2: as the surface treatment agent represented by the above formula (2), a compound in which in the formula (2), R represents an n-octadecyl group, and a represents 1.

AR-A: acrylic-based resin A
AR-B: acrylic-based resin B
AR-C: acrylic-based resin C
AR-D: acrylic-based resin D
AR-E: acrylic-based resin E
AR-F: acrylic-based resin F
POAA1: polyoxyalkyleneamine compound represented by the above formula (4) in which m/n satisfies a condition of 6.3, and the weight average molecular weight is 1,000.
POAA2: polyoxyalkyleneamine compound represented by the above formula (4) in which m/n satisfies a condition of 3.7, and the weight average molecular weight is 2,000.
POAA3: polyoxyalkyleneamine compound represented by the above formula (4) in which m/n satisfies a condition of 3.1, and the weight average molecular weight is 2,000.
DEDG: diethylene glycol diethyl ether
BTGH: tetraethylene glycol monobutyl ether
γBL: γ-butyrolactone
ODTES: octadecyltriethoxysilane as the surface treatment agent
ODCA: octadecyl carboxylic acid as the surface treatment agent
FHP: $CF_3(CF_2)_5(CH_2)_2P(O)-(OH)_2$ as the surface treatment agent
PEs: polyester having an acid value of 40

In addition, in Tables 2 and 3, the unit of the content of each component is percent by mass. In addition, POAA1 to POAA3 are each a block copolymer in which an amino group is bonded to one terminal of continuous oxyethylene units and a methyl group is bonded to one terminal of continuous oxypropylene units.

In addition, as for the metal pigment forming the coloring composition of each of the above Examples, arbitrary 50 metal particles were observed. Subsequently, when the particle is viewed in a direction in which a projection area thereof is maximized, that is, when the particle is viewed in plan, the area thereof is represented by $S_1$ [μm²], and an area of the particle viewed in one direction among the directions orthogonal to the observation direction at which the area thereof is maximized is represented by $S_0$ [μm²]. Next, $S_1/S_0$ was obtained, and the average values thereof in the individual Examples were all 19 or more.

The volume average particle diameter D50 in the table was measured using a Microtrac MT-3300 (laser diffraction/scattering type particle size distribution measurement device, manufactured by MicrotracBEL Corp.). In addition, the viscosities of the coloring compositions at 25° C. of the above Examples 1 to 21 measured using a rotational viscometer in accordance with JIS Z8809 were all in a range of 1.5 to 15 mPa·s.

The average thickness of the metal pigment was measured by the atomic force microscope described above.

TABLE 2

| | METAL PIGMENT | | | | SPECIFIC SURFACE TREATMENT AGENT CONTENT | | | | | | ACRYLIC-BASED RESIN CONTENT | | |
|---|---|---|---|---|---|---|---|---|---|---|---|---|---|
| | COMPO-SITION | AVERAGE THICKNESS | AVERAGE PARTICLE DIAMETER D50 | CONTENT | (1)-1 | (1)-2 | (1)-3 | (1)-4 | (2)-1 | (2)-2 | AR-A | AR-B | AR-C |
| EXAMPLE 1 | Al | 12 nm | 0.24 μm | 1.5 | 0.15 | — | — | — | — | — | 0.2 | — | — |
| EXAMPLE 2 | Al | 21 nm | 0.24 μm | 1.5 | 0.15 | — | — | — | — | — | 0.2 | — | — |
| EXAMPLE 3 | Al | 26 nm | 0.74 μm | 1.5 | 0.15 | — | — | — | — | — | 0.2 | — | — |
| EXAMPLE 4 | Al | 12 nm | 0.24 μm | 1.5 | 0.15 | — | — | — | — | — | — | 0.05 | — |
| EXAMPLE 5 | Al | 12 nm | 0.24 μm | 1.5 | 0.15 | — | — | — | — | — | — | 0.1 | — |
| EXAMPLE 6 | Al | 12 nm | 0.24 μm | 1.5 | 0.15 | — | — | — | — | — | — | 0.2 | — |
| EXAMPLE 7 | Al | 12 nm | 0.24 μm | 1.5 | 0.15 | — | — | — | — | — | — | 1.0 | — |
| EXAMPLE 8 | Al | 12 nm | 0.24 μm | 1.5 | 0.15 | — | — | — | — | — | — | 3.0 | — |
| EXAMPLE 9 | Al | 12 nm | 0.24 μm | 1.5 | 0.15 | — | — | — | — | — | — | — | 0.2 |
| EXAMPLE 10 | Al | 12 nm | 0.24 μm | 1.5 | 0.15 | — | — | — | — | — | — | — | — |
| EXAMPLE 11 | Al | 12 nm | 0.24 μm | 1.5 | 0.15 | — | — | — | — | — | — | — | — |
| EXAMPLE 12 | Al | 12 nm | 0.24 μm | 1.5 | — | 0.15 | — | — | — | — | — | 0.2 | — |
| EXAMPLE 13 | Al | 12 nm | 0.24 μm | 1.5 | — | — | 0.15 | — | — | — | — | 0.2 | — |
| EXAMPLE 14 | Al | 12 nm | 0.24 μm | 1.5 | — | — | — | 0.075 | — | — | — | 0.2 | — |
| EXAMPLE 15 | Al | 12 nm | 0.24 μm | 1.5 | — | — | — | 0.15 | — | — | — | 0.2 | — |

| | ACRYLIC-BASED RESIN CONTENT | | | POLYOXY-ALKYLENEAMINE COMPOUND CONTENT | | | LIQUID MEDIUM COMPONENT CONTENT | | | OTHER COMPONENTS CONTENT | | | |
|---|---|---|---|---|---|---|---|---|---|---|---|---|---|
| | AR-D | AR-E | AR-F | POAA1 | POAA2 | POAA3 | DEDG | BTGH | γBL | ODTES | ODCA | FHP | PEs |
| EXAMPLE 1 | — | — | — | — | — | 0.15 | 85.5 | 10.0 | 2.5 | — | — | — | — |
| EXAMPLE 2 | — | — | — | — | — | 0.15 | 85.5 | 10.0 | 2.5 | — | — | — | — |
| EXAMPLE 3 | — | — | — | — | — | 0.15 | 85.5 | 10.0 | 2.5 | — | — | — | — |
| EXAMPLE 4 | — | — | — | — | — | 0.15 | 85.65 | 10.0 | 2.5 | — | — | — | — |
| EXAMPLE 5 | — | — | — | — | — | 0.15 | 85.6 | 10.0 | 2.5 | — | — | — | — |
| EXAMPLE 6 | — | — | — | — | — | 0.15 | 85.5 | 10.0 | 2.5 | — | — | — | — |
| EXAMPLE 7 | — | — | — | — | — | 0.15 | 84.7 | 10.0 | 2.5 | — | — | — | — |
| EXAMPLE 8 | — | — | — | — | — | 0.15 | 82.7 | 10.0 | 2.5 | — | — | — | — |
| EXAMPLE 9 | — | — | — | — | — | 0.15 | 85.5 | 10.0 | 2.5 | — | — | — | — |
| EXAMPLE 10 | 0.2 | — | — | — | — | 0.15 | 85.5 | 10.0 | 2.5 | — | — | — | — |
| EXAMPLE 11 | — | 0.2 | — | — | — | 0.15 | 85.5 | 10.0 | 2.5 | — | — | — | — |
| EXAMPLE 12 | — | — | — | — | — | 0.15 | 85.5 | 10.0 | 2.5 | — | — | — | — |
| EXAMPLE 13 | — | — | — | — | — | 0.15 | 85.5 | 10.0 | 2.5 | — | — | — | — |
| EXAMPLE 14 | — | — | — | — | — | 0.15 | 85.575 | 10.0 | 2.5 | — | — | — | — |
| EXAMPLE 15 | — | — | — | — | — | 0.15 | 85.5 | 10.0 | 2.5 | — | — | — | — |

TABLE 3

| | METAL PIGMENT | | | | SPECIFIC SURFACE TREATMENT AGENT CONTENT | | | | | | ACRYLIC-BASED RESIN CONTENT | | |
|---|---|---|---|---|---|---|---|---|---|---|---|---|---|
| | COMPO-SITION | AVERAGE THICKNESS | AVERAGE PARTICLE DIAMETER D50 | CONTENT | (1)-1 | (1)-2 | (1)-3 | (1)-4 | (2)-1 | (2)-2 | AR-A | AR-B | AR-C |
| EXAMPLE 16 | Al | 12 nm | 0.25 μm | 1.5 | — | — | — | 0.3 | — | — | — | 0.2 | — |
| EXAMPLE 17 | Al | 12 nm | 0.25 μm | 1.5 | — | — | — | — | 0.15 | — | — | 0.2 | — |
| EXAMPLE 18 | Al | 12 nm | 0.25 μm | 1.5 | — | — | — | — | — | 0.15 | — | 0.2 | — |
| EXAMPLE 19 | Al | 12 nm | 0.25 μm | 1.5 | — | — | — | — | 0.075 | — | 0.075 | 0.2 | — |
| EXAMPLE 20 | Al | 12 nm | 0.24 μm | 1.5 | — | — | — | 0.15 | — | — | — | 0.2 | — |
| EXAMPLE 21 | Al | 12 nm | 0.25 μm | 1.5 | — | — | — | 0.15 | — | — | — | 0.2 | — |
| COMPARATIVE EXAMPLE 1 | Al | 12 nm | 0.25 μm | 1.5 | — | — | — | 0.15 | — | — | — | — | — |
| COMPARATIVE EXAMPLE 2 | Al | 12 nm | 0.24 μm | 1.5 | — | — | — | 0.15 | — | — | — | — | — |
| COMPARATIVE EXAMPLE 3 | Al | 12 nm | 0.25 μm | 1.5 | — | — | — | 0.15 | — | — | — | — | — |
| COMPARATIVE EXAMPLE 4 | Al | 12 nm | 0.25 μm | 1.5 | — | — | — | 0.15 | — | — | — | — | — |
| COMPARATIVE EXAMPLE 5 | Al | 12 nm | 0.25 μm | 1.5 | — | — | — | — | — | — | — | 0.2 | — |
| COMPARATIVE EXAMPLE 6 | Al | 12 nm | 0.25 μm | 1.5 | — | — | — | — | — | — | — | 0.2 | — |

TABLE 3-continued

| | | | | | | | | | | | | | | |
|---|---|---|---|---|---|---|---|---|---|---|---|---|---|---|
| COMPARATIVE EXAMPLE 7 | Al | 12 nm | 0.25 μm | 1.5 | — | — | — | — | — | — | — | — | 0.2 | — |
| COMPARATIVE EXAMPLE 8 | Al | 12 nm | 0.24 μm | 1.5 | — | — | — | — | — | — | — | — | 3.0 | — |

| | ACRYLIC-BASED RESIN CONTENT | | | POLYOXY-ALKYLENEAMINE COMPOUND CONTENT | | | LIQUID MEDIUM COMPONENT CONTENT | | | OTHER COMPONENTS CONTENT | | | |
|---|---|---|---|---|---|---|---|---|---|---|---|---|---|
| | AR-D | AR-E | AR-F | POAA1 | POAA2 | POAA3 | DEDG | BTGH | γBL | ODTES | ODCA | FHP | PEs |
| EXAMPLE 16 | — | — | — | — | — | 0.15 | 85.35 | 10.0 | 2.5 | — | — | — | — |
| EXAMPLE 17 | — | — | — | — | — | 0.15 | 85.5 | 10.0 | 2.5 | — | — | — | — |
| EXAMPLE 18 | — | — | — | — | — | 0.15 | 85.5 | 10.0 | 2.5 | — | — | — | — |
| EXAMPLE 19 | — | — | — | — | — | 0.15 | 85.5 | 10.0 | 2.5 | — | — | — | — |
| EXAMPLE 20 | — | — | — | 0.15 | — | — | 85.5 | 10.0 | 2.5 | — | — | — | — |
| EXAMPLE 21 | — | — | — | — | 0.15 | — | 85.5 | 10.0 | 2.5 | — | — | — | — |
| COMPARATIVE EXAMPLE 1 | — | — | 0.2 | — | — | 0.15 | 85.5 | 10.0 | 2.5 | — | — | — | — |
| COMPARATIVE EXAMPLE 2 | — | — | — | — | — | 0.15 | 85.6 | 10.0 | 2.5 | — | — | — | 0.1 |
| COMPARATIVE EXAMPLE 3 | — | — | — | — | — | 0.15 | 85.5 | 10.0 | 2.5 | — | — | — | 0.2 |
| COMPARATIVE EXAMPLE 4 | — | — | — | — | — | 0.15 | 84.7 | 10.0 | 2.5 | — | — | — | 1.0 |
| COMPARATIVE EXAMPLE 5 | — | — | — | — | — | 0.15 | 85.5 | 10.0 | 2.5 | 0.15 | — | — | — |
| COMPARATIVE EXAMPLE 6 | — | — | — | — | — | 0.15 | 85.5 | 10.0 | 2.5 | — | 0.15 | — | — |
| COMPARATIVE EXAMPLE 7 | — | — | — | — | — | 0.15 | 85.5 | 10.0 | 2.5 | — | — | 0.15 | — |
| COMPARATIVE EXAMPLE 8 | — | — | — | — | — | 0.15 | 82.7 | 10.0 | 2.5 | — | — | 0.15 | — |

[6] Evaluation

[6-1] Dispersion Stability of Metal Particles

The coloring composition of each of the above Examples and Comparative Examples was filled in a predetermined ink pack, was left in a constant-temperature bath at 50° C. for 7 days, and was then slowly cooled to room temperature.

Subsequently, after the coloring composition described above was measured using a particle size distribution measurement device (MT3300EXII, manufactured by Microtrac, Inc.) to obtain the volume average particle diameter D50 of the metal particles, an increase rate in the volume average particle diameter D50 was obtained from that of the metal particles contained in the coloring composition before the composition was placed in the constant-temperature bath, and the evaluation was performed in accordance with the following criteria. As the increase rate of the volume average particle diameter D50 is decreased, the dispersion stability of the metal particles is evaluated as better.

A: increase rate of volume average particle diameter D50 is less than 3%.
B: increase rate of volume average particle diameter D50 is 3% to less than 5%.
C: increase rate of volume average particle diameter D50 is 5% to less than 10%.
D: increase rate of volume average particle diameter D50 is 10% or more.

[6-2] Glossiness of Colored Body

First, by using the coloring composition of each of the above Examples and Comparative Examples, the colored body was produced as described below.

That is, first, after the coloring composition was charged in an ink jet apparatus, a colored portion was formed on a poly(vinyl chloride)-made film (Mactac5829R, manufactured by Mactac) at a density of 5 mg/inch$^2$ and at a recording resolution of 1,440×1,440 dpi by ejecting the coloring composition using the ink jet apparatus described above, so that the colored body was obtained. As the ink jet apparatus, a modified machine of SC-S606850 manufactured by Seiko Epson Corporation was used. The ink jet apparatus had a nozzle density of 360 npi and 360 nozzles in one nozzle line. In addition, a recording medium temperature at a platen during the adhesion of the coloring composition was set to 45° C., and a recording medium temperature at an after heater was set to 60° C.

The glossiness of the colored portion of the colored body of each of the above Examples and Comparative Examples obtained as described above was measured using a gloss meter, MINOLTA MULTI GLOSS 268, at a tilt angle of 600 and was then evaluated in accordance with the following criteria. As this value is increased, the glossiness is evaluated as better. A rank C or higher was regarded as a preferable level.

A: glossiness is 450 or more.
B: glossiness is 430 to less than 450.
C: glossiness is 400 to less than 430.
D: glossiness is less than 400.

[6-3] Adhesion of Colored Portion

As for the colored body produced in the above [6-2] of each of the above Examples and Comparative Examples, after a Cellotape (registered trademark) No. 405 (manufactured by Nichiban C., Ltd.) was adhered on the surface of the poly(vinyl chloride)-made film on which the colored portion was provided, and the tape described above was then peeled away at a peeling angle of 180° C. and a peeling rate of 1 m/min, the glossiness of a part at which the colored portion was formed was measured at a tilt angle of 60° C. by a gloss meter, MINOLTA MULTI GLOSS 268, to obtain a decrease rate in glossiness from the glossiness obtained in the above [6-2] and was then evaluated in accordance with the following criteria. As this value is decreased, the adhesion of the colored portion is evaluated as better. A rank C or higher was regarded as a preferable level.

A: decrease rate in glossiness is less than 5%.
B: decrease rate in glossiness is 5% to less than 10%.
C: decrease rate in glossiness is 10% to less than 20%.
D: decrease rate in glossiness is 20% or more.

In addition, except for that a poly(ethylene terephthalate)-made film (E1000ZC, manufactured by Lintec Corporation) was used as the recording medium instead of using a poly(vinyl chloride)-made film (Mactac5829R, manufactured by Mactac), a colored body was produced in a manner similar to that of the above [6-2], and the adhesion of the colored portion of the colored body was also evaluated by a method and criteria similar to those described above.

[6-4] Coating Film Drying Property

First, by using the coloring composition of each of the above Examples and Comparative Examples, the colored body was produced as described below.

That is, first, on a poly(vinyl chloride)-made film (Mactac5829R, manufactured by Mactac) as a recording medium, the coloring composition was applied to have a thickness of 18 μm by a bar coater #7. Subsequently, the coloring composition described above was left still at 23° C. for 5 minutes.

Subsequently, on the surface of the poly(vinyl chloride)-made film of the colored body produced as described above on which the coloring composition was applied, a poly(vinyl chloride)-made film (Mactac5829R, manufactured by Mactac) provided with no coloring composition was overlapped at a rear side thereof and was again left still with a load of 100 g in a region of 2 cm² for 15 minutes.

Subsequently, after the poly(vinyl chloride)-made film provided with no coloring composition thus overlapped was removed, the surface of the poly(vinyl chloride)-made film of the colored body to which the coloring composition was applied was observed by visual inspection and was evaluated in accordance with the following criteria. As the offset is decreased, the coating film drying property was evaluated as better.

A: No offset is observed.
B: slight offset is observed.
C: Offset is partially observed.
D: large and entire offset is observed.

[6-5] Ejection Stability

After a liquid droplet ejection device was prepared in a thermal chamber, and in a state in which a drive wave form of a piezoelectric element was optimized, as for the coloring composition of each of the above Examples and Comparative Examples, liquid droplets were continuously ejected from all nozzles of a liquid droplet ejection head having a nozzle hole diameter of 22 μm in an environment at a temperature of 25° C. and a relative humidity of 50%. From flying images of liquid droplets taken for 40 seconds from the ejection start, for example, an image in which no liquid droplets were taken and an image in which the trajectory of the liquid droplet was curved by 25% or more as compared to that of the liquid droplet ejected at an initial stage were picked up and were collectively counted as the number of defective nozzles. Subsequently, a rate of the number of defective nozzles with respect to the number of all the nozzles was calculated and was then evaluated in accordance with the following criteria. As the rate described above is decreased, the ejection stability is evaluated as better.

A: Rate of number of defective nozzles is less than 5%.
B: Rate of number of defective nozzles is 5% to less than 10%.
C: Rate of number of defective nozzles is 10% to less than 20%.
D: Rate of number of defective nozzles is 20% or more.

The results thereof are shown in Table 4.

TABLE 4

| | DISPERSION STABILITY OF METAL PARTICLES | GLOSSINESS OF COLORED BODY | ADHESION OF COLORED PORTION | | COATING FILM | |
|---|---|---|---|---|---|---|
| | | | POLY(VINYL CHLORIDE) | POLY(ETHYLENE TEREPHTHALATE) | DRYING PROPERTY | EJECTION STABILITY |
| EXAMPLE 1 | A | B | B | B | A | A |
| EXAMPLE 2 | A | B | B | B | A | A |
| EXAMPLE 3 | A | A | B | B | A | C |
| EXAMPLE 4 | A | B | C | C | A | A |
| EXAMPLE 5 | A | B | B | B | A | A |
| EXAMPLE 6 | A | B | A | A | A | A |
| EXAMPLE 7 | B | B | A | A | B | B |
| EXAMPLE 8 | C | C | A | A | C | B |
| EXAMPLE 9 | B | B | B | B | A | B |
| EXAMPLE 10 | B | C | B | B | A | B |
| EXAMPLE 11 | B | C | A | A | A | B |
| EXAMPLE 12 | A | B | A | A | A | A |
| EXAMPLE 13 | A | B | A | A | A | A |
| EXAMPLE 14 | A | B | A | A | A | A |
| EXAMPLE 15 | A | A | A | A | A | A |
| EXAMPLE 16 | A | B | A | A | A | A |
| EXAMPLE 17 | A | B | A | A | A | A |
| EXAMPLE 18 | A | A | A | A | A | A |
| EXAMPLE 19 | A | A | A | A | A | A |
| EXAMPLE 20 | C | B | A | A | A | C |
| EXAMPLE 21 | A | A | A | A | A | A |
| COMPARATIVE EXAMPLE 1 | D | D | A | A | A | D |
| COMPARATIVE EXAMPLE 2 | A | B | D | D | C | A |
| COMPARATIVE EXAMPLE 3 | A | C | D | D | C | A |

TABLE 4-continued

| | DISPERSION STABILITY OF METAL PARTICLES | GLOSSINESS OF COLORED BODY | ADHESION OF COLORED PORTION | | COATING FILM | |
| --- | --- | --- | --- | --- | --- | --- |
| | | | POLY(VINYL CHLORIDE) | POLY(ETHYLENE TEREPHTHALATE) | DRYING PROPERTY | EJECTION STABILITY |
| COMPARATIVE EXAMPLE 4 | A | D | D | D | D | A |
| COMPARATIVE EXAMPLE 5 | A | D | A | A | A | A |
| COMPARATIVE EXAMPLE 6 | A | D | A | A | A | A |
| COMPARATIVE EXAMPLE 7 | C | A | D | D | A | B |
| COMPARATIVE EXAMPLE 8 | D | B | D | D | C | D |

As apparent from Table 4, the above Examples in which the coloring composition of the present disclosure was used can be preferably applied to the production of the colored body which has an excellent glossy feeling and which has an excellent adhesion between the substrate to which the coloring composition is applied and the colored portion formed by the coloring composition. Furthermore, for example, the dispersion stability of the metal particles, the coating film drying property, and the ejection stability are also excellent.

On the other hand, the above Comparative Examples in which the coloring composition of the present disclosure was not used were all inferior in one of the glossiness and the adhesion.

In addition, except for that as the recording medium, a tarpaulin was used, evaluations similar to the above [6-2], [6-3], and [6-4] were performed, and results similar to those described above could be obtained.

What is claimed is:

1. A coloring composition comprising:
   a metal pigment;
   an acrylic-based resin having an acid value of 200 mgKOH/g or less; and
   a liquid medium component,
   wherein the metal pigment includes metal particles,
   the metal particles are surface-modified with a surface treatment agent, and
   the surface treatment agent includes at least one selected from the group consisting of a compound represented by the following formula (1) and a compound represented by the following formula (2)

$(RO)_a P(O)(OH)_{3-a}$     (1)

$(R)P(O)(OH)_2$     (2)

where in the formulas, R represents a hydrocarbon group having one carbon atom or more, and a represents 1 or 2.

2. The coloring composition according to claim 1, wherein R represents a hydrocarbon group having 10 to 30 carbon atoms.

3. The coloring composition according to claim 1, wherein the acid value of the acrylic-based resin is 1 to 100 mgKOH/g.

4. The coloring composition according to claim 1, wherein the acrylic-based resin has a weight average molecular weight of 5,000 to 20,000.

5. The coloring composition according to claim 1, wherein the acrylic-based resin is formed from at least one acrylic-based monomer, and a rate thereof occupied in the acrylic-based resin is 90 percent by mass or more.

6. The coloring composition according to claim 1, wherein the coloring composition is a solvent-based composition containing an organic solvent as the liquid medium component.

7. The coloring composition according to claim 1, wherein the metal particles are composed of aluminum or an aluminum alloy.

8. The coloring composition according to claim 1, wherein metal particles are in the form of scales.

9. The coloring composition according to claim 1, wherein a content of the surface treatment agent with respect to 100 parts by mass of the metal particles is 1.0 to 50 parts by mass.

10. The coloring composition according to claim 1, wherein the coloring composition is an ink jet ink composition.

11. A coloring method comprising:
    adhering the coloring composition according to claim 1 to an object to be colored.

12. The coloring method according to claim 11, wherein the adhering the coloring composition is a step of ejecting the coloring composition which is an ink jet ink composition by an ink jet method so as to adhere to the object functioning as a recording medium.

13. The coloring composition according to claim 1, wherein in the formulas (1) and (2), R represents an alkyl group, an alkenyl group, or an alkynyl group.

14. The coloring composition according to claim 1, wherein the metal particles surface-modified with the surface treatment agent are obtained by the surface-treatment agent reacting with the metal particles.

\* \* \* \* \*